Figure 1:
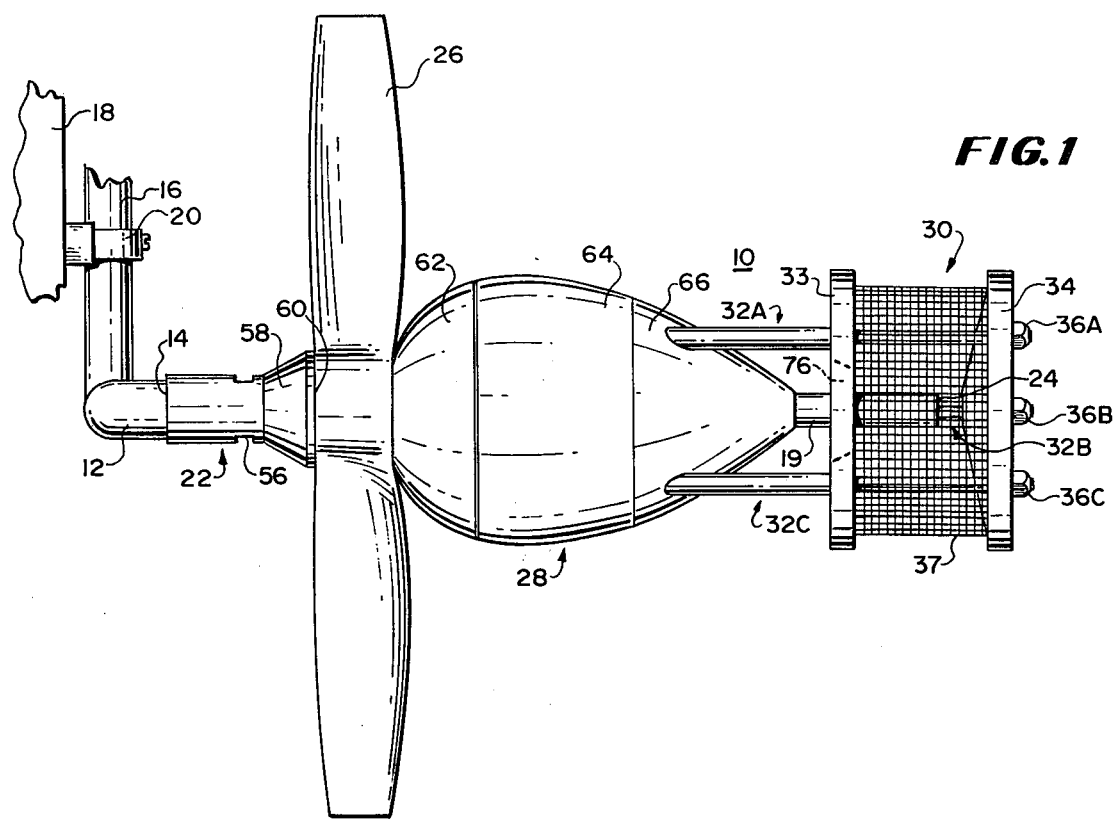

United States Patent [19]

Garner

[11] 4,034,915
[45] July 12, 1977

[54] SPRAY NOZZLE

[76] Inventor: Edward Parish Garner, R.R. No. 2, Falls City, Nebr. 68355

[21] Appl. No.: 682,256

[22] Filed: May 3, 1976

[51] Int. Cl.² .................................................. B05B 3/02
[52] U.S. Cl. ........................... 239/171; 239/214.13; 239/214.25; 239/222.11
[58] Field of Search ............ 239/171, 222, 214.13, 239/214.15, 214.17, 214.25, 222.19, 222.11

[56] References Cited

U.S. PATENT DOCUMENTS

| | | | |
|---|---|---|---|
| 1,513,599 | 10/1924 | Kay | 239/214.17 X |
| 2,721,102 | 10/1955 | Nissen | 239/171 |
| 3,589,613 | 6/1971 | Saladin | 239/171 X |
| 3,618,857 | 11/1971 | Rautenbach et al. | 239/171 X |
| 3,945,572 | 3/1976 | Bockenstette | 239/171 |

*Primary Examiner*—John J. Love
*Attorney, Agent, or Firm*—Vincent L. Carney

[57] ABSTRACT

To prevent damage to the bearings and to provide a finer mist, the body of a spray nozzle for use in aircraft has an outer surface which curves outwardly from its longitudinal axis in the forward portion to provide minimum turbulance and curves inwardly at its trailing section to cause air to converge at a vortex within a screen cage that rotates with the body of the nozzle. The body is rotated by a propeller on ball bearings around an applicator tube which has its outlet positioned adjacent to the vortex to guide insecticide or the like into the vortex for spraying through the rotating cage.

11 Claims, 2 Drawing Figures

U.S. Patent

July 12, 1977

4,034,915

SPRAY NOZZLE

This invention relates to spray nozzles and more particularly to spray nozzles for the application of fluids such as insecticides and the like from applicator aircraft to crops.

One class of spray nozzle for applying fluids from aircraft includes a central applicator tube, a rotatable body, a propeller and a cage assembly. The central applicator tube is mounted to the aircraft for guiding the flow of the fluid and has, rotatably mounted upon it, a central body with a propeller at its forward end for rotating the body therewith and a cage at its aft end positioned around the outlet of the central applicator tube. In this class of spray nozzle, wind passing the aircraft rotates the propeller of the nozzle which rotates the body and the cage while the fluid flows through the central pine into the cage. The fluid is emitted through the rotating screen by centrifugal force and air pressure for application to a crop, the size of the droplets are controlled by the screen mesh. For example a No. 20 mesh screen results in a mist having large drops and a No. 40 mesh screen results in a mist formed of small drops.

In the prior art nozzles of this class, the body of the nozzle is relatively square in shape. It is generally molded and fastened by bolts to the other parts with bearings being molded within its interior or fastened by other means.

The prior art nozzle of this class has several disadvantages, such as: (1) it is difficult to disassemble in order to lubricate the bearings or for other purposes; (2) it is relatively expensive to fabricate; (3) the insecticide or the like leaving the central tube readily finds its way into the bearings which are mounted between the tube and the rotating body and shortens their life by corrosion; and (4) the mist is, under some circumstances, not as uniform or fine as desired.

Accordingly, it is an object of the invention to provide a novel spray nozzle.

It is a further object of the invention to provide a spray nozzle that helps to control drift of the mist.

It is a still further object of the invention to provide a spray nozzle for applying fluids from an aircraft in a uniform mist.

It is a still further object of the invention to provide a spray nozzle for applying fluids from an aircraft with pinpoint accuracy.

It is a still further object of the invention to provide a novel aircraft applicator nozzle which is relatively inexpensive.

It is a still further object of the invention to provide a spray nozzle for applying fluids from an aircraft in which the sprayed substance is less likely to enter the bearings of the nozzle.

It is a still further object of the invention to provide a novel spray nozzle in which the mist is controllable and widely distributed.

It is a still further object of the invention to provide a novel applicator nozzle for applying fluids from an aircraft which is relatively easy to assemble and disassemble.

In accordance with the above and other objects of the invention, a spray nozzle for applying fluid from aircraft includes a central pipe for guiding the fluid, a nozzle body rotatably mounted around the tube and having a propeller mounted on one end for rotation therewith under the force of the wind and a cage mounted on the other end, with the outlet port of the central pipe being within the cage.

The central rotating body is streamlined with the trailing surface being sloped to form a vortex of the air flowing around the central body at a location within the cage. The cage has a fine screen cylindrical mesh on its outer surface with a solid back which prevents the fluid from flowing straight back from the nozzle and a circular opening in its forward surface for receiving the central pipe and the air flowing over the body of the nozzle.

The nozzle is advantageously mounted to the spray boom on the aircraft by a threaded nipple inserted into the central pipe that communicates with and is held to the boom. The spray boom is mounted on the wing of the aircraft by brackets or the like. The central pipe receives the fluid from a hose or pipe to which it is supplied under pressure by a pump or a pressure tank under the control of the operator within the aircraft during a spraying operation.

The rotating body is formed in three sections: a forward section, a central section and an aft section—each of which is mounted for rotation about the central pipe. The hub of the propeller is fastened to the forward section by screws passing through the hub of the propeller and all three sections receive stud bolts, each of which engages the cage assembly at one of its ends, with the stud bolts passing through the central and the aft section and being threaded into the forward section at their other end to hold the hub, cage assembly and the three sections together.

The central pipe has a recessed portion near its forward end which passes through the propeller hub and a threaded portion at its aft end upon which a nut is threaded, or in the alternative, a groove into which a snap ring fits to hold in place the bearings about which the body of the nozzle rotates. The cage assembly is separated from the body of the nozzle by cylindrical spacers which are positioned over the stud bolts and engage at one end recesses in the aft section of the rotating body and at the other end the annular outer surface of the cage assembly. In the alternative, fin shaped spacers may be formed as part of the cage assembly to aid in guiding the air flow into the cage assembly as well as to serve as a spacer.

In operation, air, which is forced against the propeller of the nozzle by the motion of the aircraft, rotates the nozzle propeller and since the propeller is connected to the body by screws, the body and the cage assembly attached to it are also rotated. The air flows past the propeller and over the stream-lined rotating body of the nozzle which guides it downwardly into a vortex within the cage just aft of the end of the central pipe so that the fluid emitted from the central pipe passes into the vortex. The turbulence in the vortex combines the air with fluid from the central pipe and forces the mixture through the screen as a fine mist which is well distributed. This air flow also prevents the fluid from flowing back between the central pipe and the rotating body of the nozzle so that the bearings about which the body rotates are less likely to corrode.

From the above description, it can be understood that the nozzle of this invention has several advantages such as: (1) it is easily assembled and disassembled for repair, lubrication or the like; (2) it is inexpensively fabricated; (3) the fluid being emitted from the central pipe is prevented from flowing back between the pipe and the rotating body by the flow of air around the streamlined body thus reducing corrosion of the bearings therein; and (4) the fluid is more evenly distributed in a mist by the air which is channeled by the streamlined body into a vortex within the rotating cage assembly.

Figure 2:
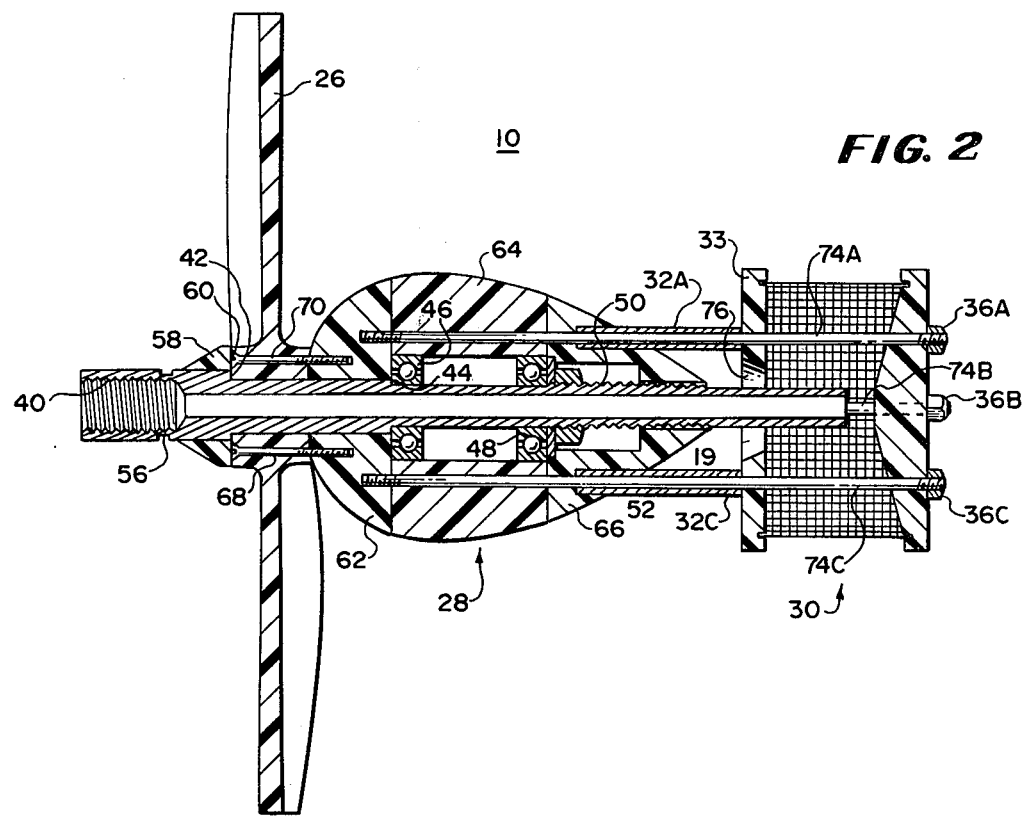

The above noted and other features of the invention will be better understood from the following detailed description when considered with reference to the accompanying drawings in which:

FIG. 1 is a perspective view of a spray nozzle in accordance with the invention; and FIG. 2 is a longitudinal sectional view of the spray nozzle of FIG. 1.

In FIG. 1, there is shown a spray nozzle 10 which communicates with a source of fluid to be applied from an aircraft through the threaded joint 14, the pipe 12 and the pipe 16 to receive insecticide or fertilizer or the like for spraying and which is mounted to the aircraft by the threaded joint 14, pipe 12, main applicator pipe 16 and pipe brackets 20.

The nozzle 10 includes: (1) a central pipe 19 having an internally threaded inlet port 22 and an outlet port 24; (2) a propeller 26; (3) an aerodynamic nozzle body 28; and (4) a cage assembly 30. The inlet port 22 is threaded at the joint 14 to an externally threaded nipple of the pipe 12 to be in communication with the source of pressurized fluid carried by the aircraft. The propeller 26, nozzle body 28 and cage assembly 30 are mounted for rotation about the pipe 19 and are connected together for that purpose, with the aerodynamic nozzle body 28 being connected to the propeller 26 by screws and to the cage assembly 30 by three stud bolts about which the struts 32A–32C are mounted.

The cage assembly 30 receives one end of the pipe 19 through an opening in a first disc 33 and is mounted by a second end 34 against the struts 32A–32C by the three end nuts 36A–36C. The first and second ends 33 and 34 of the cage assembly 30 are disc shaped and connected by a cylindrical screen 37 to enclose the port 24 of the central pipe 19. Generally, several such nozzles 10 are mounted to the spray boom of the aircraft in positions where the air flow rotates the propellers of the nozzles with each nozzle being connected by pipes such as 12 and 16 to a controlled source of pressurized fluid which may be insecticide or fertilizer or the like. The connection to the spray boom is a threaded joint 14 of the pipe 12 which is mounted to the pipe 16, which is the main spray boom, with the pipe 16 being mounted by brackets 20 to the wing 18 and communicating with tanks of fluid through pumps.

In operation, the cage assembly 30 is rotated smoothly while fluid is injected into a vortex of air within the cage assembly, causing the fluid to be widely dispersed as a fine mist.

The rotation of the cage assembly 30 is caused by the motion of the aircraft to which the nozzle is attached. As the aircraft is driven, wind caused by the motion of the aircraft and by operation of its propellers causes the propellers 26 of the nozzle to rotate. As the propeller 26 rotates, it rotates the aerodynamic nozzle body 28 to which it is connected, which in turn rotates the cage assembly 30, and since the nozzle body has substantial mass, provides relatively smooth rotation because of its inertia.

When the pilot causes fluid under pressure to be pumped from the tanks of the aircraft, through the pipe 16 into the inlet port 22, the fluid flows through the central pipe 19 and out of the outlet port 24 into the cage assembly 30, being prevented from flowing out of the end of the cage by its end disc 34.

Fluid leaving the outlet port 24 is forced by air flowing over the body 28 into the open front end of the cage assembly 30 and into a turbulent air vortex which spreads it in a fine mist. The rapid rotation of the screeen 37 causes the spray mix to leave by centrifugal force and air pressure for the most efficient application to the crop.

As is best shown in FIG. 2, the central pipe 19 extends from the threaded joint 14 to the outlet port 24 to guide the fluid through the nozzle 10. For this purpose, it has: (1) a plurality of internal threads 40 for receiving an externally threaded nipple of the pipe 12 (FIG. 1) at 14; (2) a first external shoulder 42 providing a reduced diameter for receiving the propeller 26; (3) a second shoulder 44 for providing a second reduced diameter to receive two ball bearing racers 46 and 48 within the aerodynamic nozzle body 28; (4) a threaded portion 50 for receiving the threaded nut 52; and (5) the notched portions 56 for receiving a wrench to aid in removing the nozzle from the boom attachment.

The propeller 26 is mounted within the reduced diameter portion of the pipe 19 against the shoulder 42 and rotates therearound, being in contact with it only with a relatively free-moving plastic surface. The propeller 26 in the preferred embodiment is polypropylene or some other plastic with a relatively low coefficient of friction and the central pipe is brass or stainless steel to provide good resistance against corrosion and a suitable bearing surface.

To provide aerodynamic action channeling the wind over the hub of propeller, a plastic retaining piece or nose 58 is provided, shaped externally as a conical frustum, with a central aperture fitting tightly around the external diameter of pipe 19 between the shoulder 42 and the inlet portion 22. The propeller 26 includes a hub 60 which engages the flat bottom end of the plastic piece 58 in a rotatable sliding fit.

To mount the propeller 26 to the cage assembly 30 and to provide sufficient inertia for a flywheel effect so as to insure even rotation of the nozzle, the nozzle body 28 is relatively large in mass and connected to both the propeller 26 and cage assembly 30 for rotation therewith. Its outer surface is streamlined or generally egg-shaped to provide good aerodynamic flow over its surface and into the central aperture of the cage assembly 30.

For ease in assembly and disassembly and for economy of fabrication, the body 28 includes three sections, which are: (1) a forward section 62; (2) a central section 64; and (3) an aft section 66—mounted adjacent to each other in the order named. The forward section 62 receives two flat-head screws 68 and 70 to the heads of which fit flush with the surface of the propeller 26 and extend therethrough with their lower ends being threaded into the forward section 62 so that the nozzle body 28 rotates with the propeller 26.

The forward section 62 is curved outwardly and abuts the central section 64 with complementary flat surfaces and the aft section 66 curves downwardly and abuts the central section 64 with similar complementary flat surfaces. The central section 64 is curved on opposite ends to provide a smooth transition between the forward section 62 and the aft section 66, and is mounted by the ball bearing racers 46 and 48 aft of the second shoulder 44 of the central pipe 19 to permit free rotation of the body 28.

To hold the ball bearings and the three sections 62, 64 and 66 at the central location on the central pipe 19, the nut 52 is threaded on the external threads of the pipe 19 aft of the section 64 and separated therefrom by the washer 72 to permit rotation of the body 28 about the central pipe 19 while the nut 52 remains stationary thereon to rotatably hold the ball bearing racers between the shoulder 44 and the nut 52. In the alternative, a snap ring and groove may be substituted for the threads 50 and nut 52. The nuts 36A, 36B and 36C compress the sections of the body 28 and the cage assembly 30 together to hold them in place.

To mount the cage assembly 30 to the body 28 and to hold the three sections 62, 64 and 66 and the front sides and back of the cage assembly 30 together, three threaded studs 74A–74C: (1) pass through all three sections at circumferentially spaced equidistant apertures; (2) are threded into the forward section 62; (3) each pass through a corresponding one of the struts 32A–32C; and (4) pass through apertures in the front disc 33 and the disc 34 of the cage assembly 30 and receive the nuts 36A–36C to hold all of the above mentioned parts in position.

The struts or spacers 32A–32C provide spacing between the disc 33 of the cage assembly 30 and the aft section 66. The center section 64 and the aft section 66 have an outer shape that channels the air flowing over it through the central opening 76 in front disc 33 of the cage assembly 30, which opening has a beveled annular edge to further guide the flow of air. The inner surface of the end disc 34 of the cage assembly 30 slopes upwardly toward its center to cooperate with the flow of air in creating air pressure to keep the spray mix from flowing forward up the tube to the rear bearing and to aid in forcing the spray mix from the cage assembly 30 through the screen 37 by centrifugal force and air pressure. The outlet port 24 is spaced approximately one fourth inch from the end disc 34 and the screen 37 forms a cylinder approximately one and one half inches in diameter about them.

To aid in creating air pressure and guiding the air into the cage assembly, the struts 32A–32C may be fin shaped and formed integrally with the first end 33.

From the above description it can be understood that the nozzle of this invention has several advantages such as: (1) it is easy to assembly and disassemble; (2) the fluid emitted from the outlet port 24 is prevented from flowing back against the nozzle body 28 by the wind flowing around the aerodynamic structure and into the central aperture 76 of the cage assembly 30 thus avoiding a corrosive effect on the bearings; (3) the flow of air into the central aperture 76 caused by the aerodynamic structure of the nozzle body 28 causes a superior formation of a mist from the fluid leaving the outlet port 24; and (4) it is relatively inexpensive.

What is claimed is:

1. A nozzle for application of fluids as a mist containing droplets from an aircraft, comprising:
 tube means for guiding fluid from a source of fluid;
 said tube means having internal walls defining an inlet port and an outlet port;
 screen means mounted for rotation with respect to said tube means for controlling the size of droplets emitted from said nozzle;
 said outlet port being within said screen means;
 said screen means including a solid rear wall portion and a screen surface;
 said solid rear wall portion being substantially orthogonal to said tube means and positioned behind said outlet port and aligned therewith along the longitudinal axis of said tube means, whereby the direct flow of fluid from said outlet port contacts said solid rear wall portion;
 said screen surface being orthogonal to said rear wall portion, whereby fluid entering said screen means from said outlet port is emitted through said screen surface in droplets which are controlled in size by the mesh of said screen surface;
 said screen means further including a front wall portion;
 means for guiding the flow of air into said screen means;
 said means for guiding including a nozzle body and internal walls in said front wall portion defining an opening;
 said nozzle body having a surface curved downwardly forward of said opening in said front wall portion, whereby air passing over said body is guided through said opening within the screen means to mix with the fluid therein;
 propeller means for rotating said screen means; and
 said tube means extending through said opening.

2. A nozzle in accordance with claim 1 further including means for attaching said nozzle to an aircraft and to a source of fluid on said aircraft.

3. A nozzle in accordance with claim 1 in which said nozzle body is mounted for rotation about said tube means.

4. A nozzle in accordance with claim 1 in which said nozzle body has a longitudinal axis and is formed of three parts fastened together;
 each of said parts having different curved surfaces;
 a first of said parts and a second of said parts being separated by a third part, in the direction of the longitudinal axis of the nozzle body;
 said first part and said second part curving inwardly toward said longitudinal axis as the distance on their outer surfaces increases from said third part.

5. A nozzle according to claim 4 further including means for attaching said nozzle to an aircraft and to a source of fluid on said aircraft.

6. A nozzle according to claim 5 in which said nozzle body is mounted for rotation about said tube means.

7. A nozzle according to claim 6 in which said nozzle body is connected to said screen means for rotation therewith and said propeller means for rotating said screen means includes propeller means for rotating said nozzle body and said screen means.

8. A nozzle according to claim 7 in which said nozzle body is mounted by bearings for rotation about said tube means and carries said screen means for rotation therewith;
 said nozzle including means for mounting said parts of said nozzle body and said screen means together.

9. A nozzle according to claim 1 in which said nozzle body is mounted by bearings for rotation about said tube means and said nozzle includes means for connecting said screen means and said nozzle body for rotation together.

10. A nozzle according to claim 9 further including means for attaching said nozzle to an aircraft and to a source of fluid on said aircraft.

11. A nozzle according to claim 10 in which:
 said nozzle body has a longitudinal axis and is formed of three parts fastened together;

each of said parts having a different curved outer surface;

a first of said parts and a second of said parts being separated by a third part, in the direction of the longitudinal axis of the nozzle body;

said first part and said second part curving inwardly toward said longitudinal axis as the distance on their outer surfaces increases from said third part.

* * * * *